United States Patent
Choong et al.

(10) Patent No.: US 9,936,564 B2
(45) Date of Patent: Apr. 3, 2018

(54) AMBIENT AND TASK LEVEL LOAD CONTROL

(71) Applicant: Daintree Networks, Pty. Ltd., Scoresby (AU)

(72) Inventors: Jason Yew Choo Choong, San Jose, CA (US); Tony Garcia, Millbrae, CA (US); Dallas Ivanhoe Buchanan, Kentfield, CA (US); Danny Yu, Mountain View, CA (US)

(73) Assignee: DAINTREE NETWORKS, PTY. LTD., Scoresby (AU)

( * ) Notice: Subject to any disclaimer, the term of this patent is extended or adjusted under 35 U.S.C. 154(b) by 0 days.

(21) Appl. No.: 13/800,805

(22) Filed: Mar. 13, 2013

(65) Prior Publication Data

US 2013/0200809 A1 Aug. 8, 2013

Related U.S. Application Data

(63) Continuation of application No. 12/833,239, filed on Jul. 9, 2010, now Pat. No. 8,415,897.

(51) Int. Cl.
*H05B 33/08* (2006.01)
*H05B 37/02* (2006.01)

(52) U.S. Cl.
CPC ......... *H05B 37/02* (2013.01); *H05B 33/0845* (2013.01); *H05B 33/0854* (2013.01); *H05B 37/0218* (2013.01); *H05B 37/0245* (2013.01); *H05B 37/0227* (2013.01); *Y02B 20/46* (2013.01)

(58) Field of Classification Search
CPC .............. H05B 37/034; H05B 37/0263; H05B 37/0227; H05B 37/0218; H05B 37/0254; H05B 37/0272; H05B 37/0245; H05B 33/0845; H05B 33/0815; H05B 33/0851; H05B 33/086
USPC .................. 315/294–295, 297, 299, 307–309
See application file for complete search history.

(56) References Cited

U.S. PATENT DOCUMENTS

| | | | |
|---|---|---|---|
| 5,838,116 A | 11/1998 | Katyl et al. | |
| 6,118,231 A * | 9/2000 | Geiginger | H05B 39/042 315/294 |
| 7,598,859 B2 | 10/2009 | Laski et al. | |
| 8,098,157 B2 * | 1/2012 | Saunders et al. | 340/541 |

(Continued)

FOREIGN PATENT DOCUMENTS

| | | |
|---|---|---|
| CN | 101282605 A | 10/2008 |
| CN | 101562930 A | 10/2009 |

(Continued)

OTHER PUBLICATIONS

Chinese Notification of the First Office Action in CN201180032953.0 dated May 5, 2014, 38 pages.

(Continued)

*Primary Examiner* — Douglas W Owens
*Assistant Examiner* — Borna Alaeddini
(74) *Attorney, Agent, or Firm* — Peter T. DiMauro; GE Global Patent Operation

(57) ABSTRACT

Methods, systems, and apparatus, including computer programs encoded on a computer storage medium, for cooperatively controlling ambient level lighting in a controlled area, and task-level lighting for task areas in the controlled area, where each task area is a separate sub-area of the controlled area.

16 Claims, 5 Drawing Sheets

(56) References Cited

U.S. PATENT DOCUMENTS

| | | | | |
|---|---|---|---|---|
| 8,463,408 | B2* | 6/2013 | Boleko Ribas | H05B 37/029 700/11 |
| 2005/0110416 | A1* | 5/2005 | Veskovic | E06B 9/32 315/149 |
| 2007/0273307 | A1* | 11/2007 | Westrick | H05B 37/0218 315/312 |
| 2008/0191630 | A1 | 8/2008 | Peng | |
| 2009/0278479 | A1* | 11/2009 | Platner | H05B 37/0245 315/312 |
| 2009/0310348 | A1* | 12/2009 | Laski et al. | 362/231 |
| 2010/0052576 | A1* | 3/2010 | Steiner | H05B 37/0227 315/361 |
| 2011/0031897 | A1* | 2/2011 | Henig et al. | 315/297 |
| 2011/0051414 | A1* | 3/2011 | Bailey et al. | 362/235 |
| 2011/0127340 | A1* | 6/2011 | Aiken | F24F 11/0001 236/49.3 |
| 2012/0019168 | A1* | 1/2012 | Noda | H05B 37/0227 315/307 |
| 2012/0025717 | A1* | 2/2012 | Klusmann | H05B 37/0218 315/152 |
| 2013/0049607 | A1* | 2/2013 | Urata | G08C 17/02 315/153 |

FOREIGN PATENT DOCUMENTS

| | | |
|---|---|---|
| EP | 2160078 B1 | 11/2011 |
| JP | 2010027418 A | 2/2010 |
| JP | 2010073633 A | 4/2010 |
| JP | 2010086686 A | 4/2010 |
| KR | 2003029780 A | 4/2003 |
| KR | 2010064861 A | 6/2010 |
| WO | 2008038188 A2 | 4/2008 |
| WO | 2008078286 A1 | 7/2008 |

OTHER PUBLICATIONS

European Search Report and Written Opinion issued in connection with corresponding EP Application No. 11804231.6 dated Jun. 23, 2017.

European Office Action issued in connection with corresponding EP Application No. 11804231.6 dated Jul. 10, 2017.

PCT International Search Report and Written Opinion, PCT/US2011/042827, dated Feb. 27, 2012, 9 pages.

Transmittal of International Preliminary Report on Patentability for PCT/US2011/042827 dated Jan. 24, 2013, 6 pages.

* cited by examiner

AMBIENT AND TASK LEVEL LOAD CONTROL

CROSS-REFERENCE TO RELATED APPLICATION

This application is a continuation of U.S. patent application Ser. No. 12/833,239 entitled "Ambient and Task Level Load Control" filed Jul. 9, 2010, now U.S. Pat. No. 8,415,897, the disclosure of which is incorporated herein by reference in its entirety.

BACKGROUND

This specification relates to controlling electrical loads.

Lighting control within buildings is traditionally limited to control of lights in the ceiling that illuminate a general area. This type of control is typically referred to as ambient lighting control. More recent advances in energy-efficient lighting design have seen a shift in philosophy towards reducing the ambient light and compensating for the illumination reduction with lighting on the desk or work plane. The desk or work plane is referred to as a task area, and the illumination of the task area is referred to as task lighting. Less area illumination is typically needed for ambient light, as it is used to simply light an area, ensure that there is sufficient lighting for walkways and for safety purposes, etc. Task lighting is typically used for reading and other work activity, and thus the required illumination within the task area is typically higher than the illumination of the general area of which the task area is a sub-portion. This combination of reducing ambient lighting and providing sufficient task lighting can increase energy efficiency and lower overall power consumption.

When a person is not at the task area, there is no need to provide task-level lighting. Occupancy sensors that sense occupancy in the general area can be used to automatically turn task lamps off based on lack of occupancy, along with plug loads based on lack of occupancy. However, as a general area may often include several or more separate task areas, such as in the case of multiple work stations in a laboratory or multiple cubicles in an office setting, the sensing of a physical stimulus in one task area of the general area may result in unnecessary ambient illumination and power being provided to one or more unoccupied task areas.

Another cost-savings measure is the use of daylighting. Daylighting works by introducing a photocell sensor, usually placed in the ceiling to measure illumination level in a general area, and automatically adjusting the light output from ambient light sources based on the measured illumination levels. Daylighting, however, does not accurately control the light level in the task areas.

SUMMARY

This specification describes technologies relating to wireless system commissioning and optimization. In general, one innovative aspect of the subject matter described in this specification can be embodied in systems that include a plurality of task-level sensor devices, each task-level sensor device including a sensor device that can sense physical stimuli for being positioned to monitor the physical stimulus of a task area and generate task-level sensor data that reports the measured physical stimulus of the task area, wherein each task area for each task-level sensor is a separate sub-portion of a controlled area, and each task-level sensor data provides measurements that are proportionally responsive to only the physical stimulus occurring within the task area it monitors; and a load controller in data communication with the task-level sensor and a controlled area sensor, the controlled area sensor for monitoring the physical stimulus of a controlled area and generating controlled area sensor data that reports the measured physical stimulus of the controlled area, wherein the load controller performs operations comprising controlling the illumination level of each task area based on the task-level sensor data from the task-level sensor monitoring the task area and the controlled area sensor data. Other embodiments of this aspect include corresponding methods, apparatus, and computer programs, configured to perform the actions of the methods, encoded on computer storage devices.

Another innovative aspect of the subject matter described in this specification can be embodied in a system that includes a lighting control device, comprising an illumination source that provides illumination for a task area; a photo sensor that senses an illumination level for the task area; an occupancy sensor that senses an occupancy of the task area; processing circuitry configured to receive data from the photo sensor and the occupancy sensor and generate photo sensor data and occupancy sensor data describing the sensed illumination level and occupancy status of the task area; and a wireless transceiver configured to transmit the photo sensor data and occupancy sensor data to a load controller that controls the illumination level of the task area and a controlled area in which the task area is located, wherein the task area is a sub-portion of the controlled area.

Particular embodiments of the subject matter described in this specification can be implemented so as to realize one or more of the following advantages. The wireless communication paths provide for more integral control than traditional wired control systems, and deliver the desired functionality in a more cost-effective manner by integrating multiple control methodologies in the task area. Granular controls of electrical load for each task area is facilitated, thereby offering improved energy efficiency and enabling new control strategies that take into account the power demands required for a general area and the power demands required for each task area that is a separate sub-portion of the general area.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§ 1.0 Overview

Figure 1:
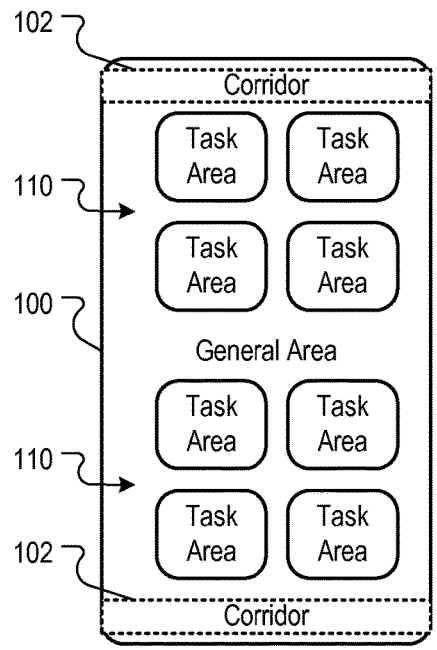
FIG. 1 is a block diagram illustrating a general area and task areas within the general area.

FIG. 1 is a block diagram illustrating a general area 100 and task areas 110 within the general area 100. Each task area is a separate sub-portion of the general area. For example, the general area may be a portion of an office floor that is illuminated by a particular bank of lighting devices, e.g., wirelessly controlled lighting devices that belong to the same network. Each general area also includes one or more of a photo sensor and one or more occupancy sensor to sense illumination levels and occupancy of the general area. The sensor data from these sensors are used, in part, to control the lighting and, optionally, power to the general area. For the remainder of this specification, the general area 100 is also referred to as the controlled area 100.

Each task area 110 may be a work surface of an office desk, a laboratory work space, or a factory workspace for an employee. Within each task area 110 are one or more wireless enabled devices. The wireless devices in each task can include lighting devices, an occupancy sensor, and a photo sensor. The sensor data from these sensors are used, in part, to control the lighting and, optionally, power to the task area 110.

For the purposes of illustration only, the wireless devices may conform to the ZigBee specification, which is based on the IEEE 802.15.4 standard. The IEEE 802.15.4 standard is a standard for low-rate wireless personal area networks (LR-WPANs). The ZigBee specification defines a suite of high level communication protocols that use low-power and low-bandwidth digital radios. The low power consumption and low bandwidth requirements of a ZigBee device reduces cost and prolongs battery life, and thus such devices are often used for sensors, monitors and controls. Other devices that communicate according to other wireless protocols can also be used, and thus the devices and processes described below can be applied to other types of wireless networks as well.

Figure 2:
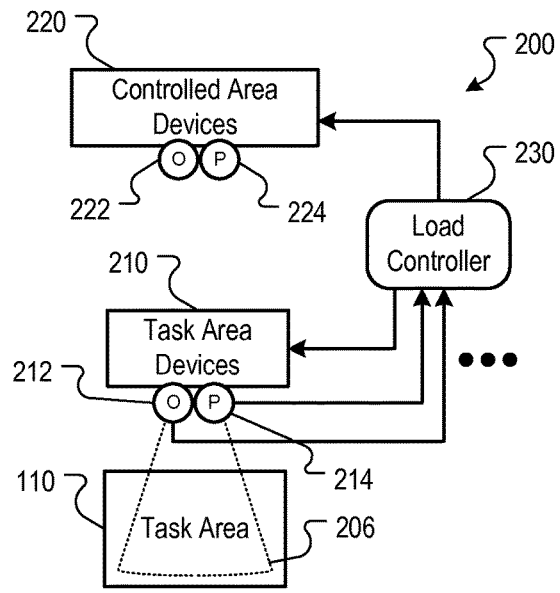
FIG. 2 is a block diagram illustrating communication links between wireless devices to provide power and lighting to a task area and a general area and a wireless load controller to control the power and lighting of the task area and general area.

FIG. 2 is a block diagram illustrating communication links between wireless devices that provide power and lighting to a task area 110 and the general area 100 and a wireless load controller 230 to control the power and lighting of the task area 110 and the general area 100. The load controller 230 can be implemented in software in any wireless device that wirelessly communicates with the task area devices 210 and the controlled area devices 220. In some implementations, the load controller 230 can be implemented in a gateway or controller for the wireless network, or, optionally, in any of the task area devices 210 or the controlled area devices 220.

The task area 110 includes task area devices 210, which can include lighting devices, plug loads, an occupancy sensor 212, and a photo sensor 214. The occupancy sensor 212 and the photo sensor 214 are sensors that sense a physical stimulus. A physical stimulus is a stimulus in an environment that is either indicative of a person's presence or indicative of a physical measurement of a characteristic of the environment. For example, the motion of a person is a physical stimulus that can be detected by a motion sensor; the body heat of a person can be detected by an infrared sensor; and illumination level can be detected by a photo sensor, etc. The wireless device can also be any other device that controls other wireless devices or wired devices (e.g., a wireless switch). The wireless devices do not need to be entirely of wireless design, as long as they have a wireless communication capability.

The task area devices 210 are in data communication with the load controller 230, and the load controller 230 is in data communication with controlled area devices 220. The controlled area devices 220 can include wireless lighting devices, switches, an occupancy sensor 222, and a photo sensor 224. As with the task area devices 210, the controlled area devices 220 do not have to be of an entirely wireless design. For example, a wireless ballast adapter may be connected to a mains power supply (e.g., a 120V power line) and receive commands from the load controller 230 to adjust the illumination level. The adjustments can include adjusting the illumination level to fully off, fully on, or anywhere in between fully off and fully on (i.e., dimming). As used herein, the term "fully off" refers to the illumination level, and does not necessarily mean a device does not consume power. For example, a lighting device may provide no discernable illumination, but its internal power and control circuitry may still consume a minimum amount of power.

The occupancy sensors 212 and 222 are used by the load controller 230 to control lights and power to other devices in the task areas 110 and controlled area 100, respectively. In some implementations, the occupancy sensor 222 can be omitted, and occupancy sensing can be done solely by the task-level occupancy sensor 212. However, use of the occupancy sensor 222 helps ensure that a presence in the general area can be detected if all persons in the general area are not present in the task areas 206, and also provides for additional control routines described below.

The photo sensor 224 is typically used for daylighting, a process by which a natural daylight coming through windows, atriums or similar transparent building material is measured and electric light from lighting devices are reduced in order to conserve electricity in such areas when the measurements indicate sufficient illumination. Likewise, the occupancy sensor 222 can be used to turn all light off in the general area when there is no occupancy detected for a predefined time period, e.g., 15 minutes.

Each sensor 212 and 214 monitors only its separate sub-portion of a controlled area 100, i.e., its corresponding task area 110. In some implementations, each sensor 212 and 214 provides measurements that are proportionally responsive to only the physical stimulus occurring within the task area 110 it monitors, i.e., within the field of view 206. For example, movement outside of the task area 110 may not be detected by the occupancy sensor 212, and illumination by a task area lighting device in another task area 110 may have very little effect on the illumination level sensed by the task-level photo sensor 214 in another task area.

In some implementations, a task area device 210 includes a wireless transceiver and is integrated with a wireless control system managed by the load controller 230. The load controller 230 uses the sensor data from the task-level sensors, and optionally the sensor data from the controlled area sensors 222 and 224, to provide an integrated control of ambient-level and task-level loads. Example loads including ambient level lighting, task-level lighting in each task area, and plug loads in each task area.

§ 2.0 Example Task Area Devices

The task area devices 210 can be implemented in a single device or distributed as separate devices with the task area 110. The task area devices can be implemented in a variety of ways, examples of which are described below.

§ 2.1 Example Integrated Task Area Devices

Figure 3A:
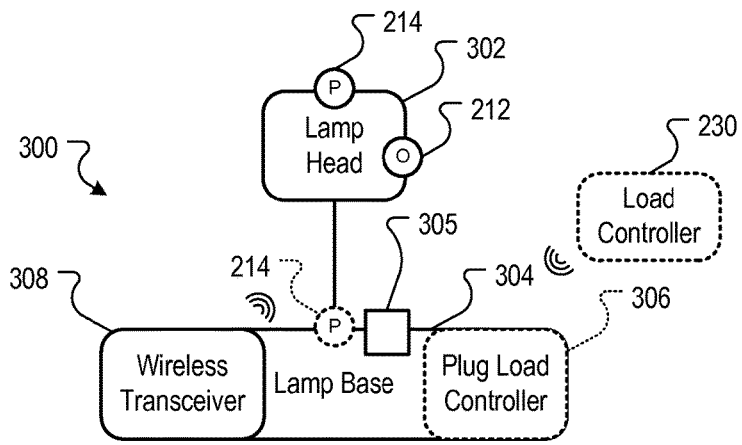
FIG. 3A is a block diagram of a lamp device that monitors and provides power and illumination for a task area.

FIG. 3A is a block diagram of lamp device 300 that monitors and provides power and illumination for a task area 110. The lamp device 300 includes a lamp head 302, a base 304, an occupancy sensor 212, a photo sensor 214, an optional plug load controller 306 (as indicated by the dashed boundary), and a wireless transceiver 308. Processing circuitry is included within the lamp device 300 and is in data communication with the transceiver 308, the lamp head 302, and sensors 212 and 214. The example configuration is illustrative only, and other configurations can be used. For example, all components of FIG. 3A can be implemented in an under cabinet lighting fixture that does not include a base that rests on a desktop.

The controller 230 communicates with the lamp device 300 to adjust the illumination level of the lamp device 300. The adjustments can include adjusting the illumination level to fully off, fully on, or anywhere in between fully off and fully on (i.e., dimming). The processing circuitry in the lamp device 300 receives data from the load controller 230 by means of the transceiver and adjusts the illumination level from the lamp head accordingly.

The lamp head 302 will typically be close to where the target light level should ideally be measured. While the photo sensor 224, which is typically placed in the ceiling, will detect the ambient light levels of the general area, it will not be able to detect the illumination level of each task area. Thus, to help provide lighting control on a per-task area level, the photo sensor 214 is placed in or near the head of the lamp and is able to take light level samples from ambient light sources very close to the work area of the task area.

There are a variety of ways in which the photo sensor 214 can be configured. In some implementations, the photo sensor 214 is placed so that it reads the illumination level generated by the lamp. For example, the photo sensor 214 can be placed so that its response axis is normal to the illumination surface of the light to read the illumination level generated by the light. As the lamp is adjusted, the change in illumination level will be detected by the photo sensor 214. In some implementations, the illumination level for the task area that can be attributed to the lamp can be further calculated by adjusting the illumination reading of the photo sensor 214 in proportion to the square of the distance from the lamp light to the task area surface, e.g., by the known height of the lamp.

In other implementations, the photo sensor 214 can be placed on the head of the lamp so that its response axis is normal to the task area surface, and will only detect the reflected ambient light falling on the surface of the work plane and not the light generated by the lamp device 300, except from the light reflected from the work plane.

In still other implementations, photo sensor 214 is placed on the base of the lamp device 300 (or, alternatively, on the plane of the task area). In these implementations, the photo sensor 214 will directly measure both the ambient illumination and illumination from the lamp head 302.

In some implementations, the controller 230 is configured to take into account the positioning of the task-level photo sensor 214. For example, when some of the task-level photo sensors are located on the plane of the task area to be illuminated, or otherwise located so that it measures both the lamp head 302 illumination and illumination form ambient lighting of the controlled area 100, and other task-level photo sensors 214 are located in the lamp head, the controller 230 can compensate for the different locations by normalizing the illumination readings. The controller 230 can, at various times, take illumination snapshots and determine normalization values for each task area. For example, the controller may, at certain times of the day (e.g., during pre-arranged calibration times, on weekends, or at night to minimize work disruptions or eliminate the influence of daylight) shut down all ambient lighting and fully illuminate each task area 110 by the respective task lighting within the task area. Likewise, the controller 230 may then shut down all task lighting and fully illuminate the controlled area 100 using only ambient lighting. The illumination levels for each illumination condition are stored and normalized so that the separate photo sensor 214 provides more consistent readings under the same lighting conditions. The process can be repeated and different times of the day to take into account daylighting change, thereby creating an illumination time profile for a 24 hour period. Seasonal changes can be taken into effect. For example, the controller 230 can be configured to repeat the normalization process on a periodic basis, e.g., every two weeks.

As the lamp device 300 will typically be in the area where occupancy at the task-level occurs, the lamp device 300 includes an occupancy sensor 212. The wireless transceiver 308 is also integrated into the task lamp to provide the wireless communication with the controller 230. When occupancy is detected, the lamp device 300 will normally be turned on, but the availability of wireless communication to controller 230 enables further action to be taken. For instance, the ambient light levels can be increased further to provide more effective ambient illumination for someone actively working (as distinct from lower levels used for safely walking in adjacent corridors or the general area).

In some implementations, the lamp device 300 receives power from mains power, such as through a 120 V, 60 Hz power supply. The power supply for the lamp device 300 is thus used to power the sensor 212 and 214, and the transceiver 308. The wireless transceiver 308 receives commands from the controller 230 to adjust the illumination level of the task area 110.

In some implementations, the sensing data from the task-level sensors 212 and 214 can be used to manage plug loads by use of the optional plug load controller 306. The plug load controller 306 is used to turn plug loads on the lamp device 300, or controlled by the lamp device 300, on or off based on sensing data obtained directly from the occupancy sensor. Alternatively, the plug load controller 306 can turn the plug loads on or off from a wireless command sent by a load controller 230. Additionally, the plug load controller 306 can measure electricity consumption and transmit the measurements wirelessly to another device by use of the wireless transceiver.

In some implementations, a manual adjustment of the lamp device 300 (e.g., by actuation of a manual control 305 that controls the illumination level of the lamp device, such as a dimmer switch) causes the lamp device to generate an override signal for the load controller 230. A manual adjustment from a current illumination level to a new illumination level by an occupant is interpreted as a signal that the current illumination level was unacceptable, and the load controller 230 is programmed to interpret the override signal as indicating an override condition, during which the load controller 230 defers to the manual setting specified by the occupant. The override condition can be limited in time, e.g., until the end of the work day or until the occupant is determined to no longer be within the task area. In some implementations, the setting can be saved, and when the occupant is determined to return to the task area, the illumination level of the task area is returned to the new illumination level specified by the occupant.

§ 2.2 Example Distributed Task Area Devices

Figure 3B:
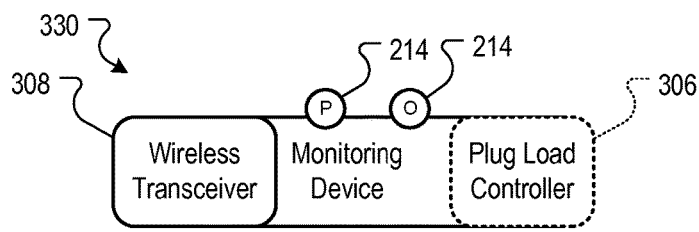
FIG. 3B is a block diagram of a task-level monitoring device that monitors power and illumination for a task area.

Instead of integrating the task area devices 210 into a single device, the task area devices can be distributed in each task area 110. FIG. 3B is a block diagram of task-level monitoring device 330 that monitors occupancy and illumination for a task area. The task-level monitoring device 330 includes the photo sensor 214, occupancy sensor 212 and the wireless transceiver 308 integrated into a single casing, and is used for the purpose of collecting and communicating the sensor data to the controller 230. A separate task area lighting device may also used. The monitoring device 330 is placed in an appropriate location on the work plane in order to sense light level falling on the work plane and occupancy in the task area, e.g., by an employee's telephone, and the base of the employee's computer, or some other location on the work plane of the task area 110 that results in minimal obtrusion.

The task-level monitoring device 330 can also be used when no task area lighting is used. For example, ambient lights can be configured to be individually controllable, and associated directly with each workspace or perhaps a group of workspaces. In this case, the monitoring device 330 can be used turn on the ambient lights appropriately (on occupancy) and adjust the light levels (using the photo sensor).

In some implementations, the monitoring device 330 can include the optional plug load controller 306. For example, the device can be integrated into a task area power strip that is placed on the work plane. In this case, the benefits described earlier with respect to integrating a plug load controller are also received.

Other configurations can also be use. For example, the monitoring device 330 can be integrated into the furniture of the task area 110, such as a location on the desk, within a partition wall of a cubicle, or on the shelf within a work cubicle.

§ 3.0 Integrated Control Of Controlled Area And Task Areas

Figure 4:
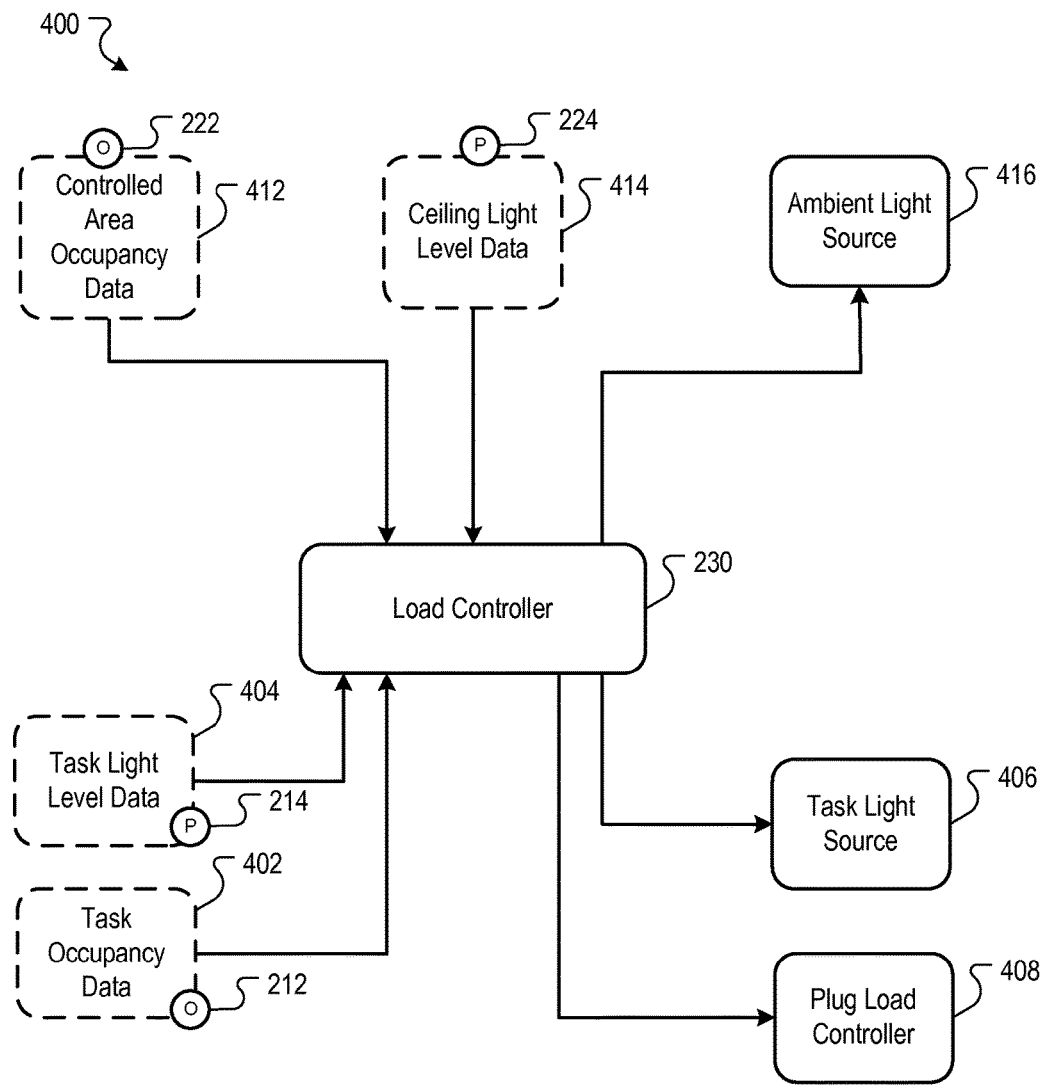
FIG. 4 is a block diagram illustrating a control system for controlling illumination of and power to task areas within a general area.

FIG. 4 is a block diagram illustrating a control system for controlling illumination of and power to task areas within a general area. The controller 230 is in data communication with task-level devices 210 that include an occupancy sensor 212, a photo sensor 214, task-level light source 406, and a plug load controller 408. The occupancy sensor 212 and the photo sensor 214 provide task occupancy data 402 and task-level light data 404 that provide a measure of the physical stimuli in the task area measured by the sensors 212 and 214.

Likewise, the controller 230 is in data communication with controlled area devices 220, such as an ambient light source 416 (e.g., a bank of lights that are controlled as a single entity), an occupancy sensor 222 and a photo sensor 224. The occupancy sensor 222 and the photo sensor 224 provide controlled area occupancy data 402 (e.g., data from an occupancy sensor on the ceiling) and controlled area light data 404 (e.g., data from a photo sensor on the ceiling) that provide a measure of the physical stimuli in the controlled area by the sensors 222 and 224.

The controller 230 executes an algorithm that manages power load in the controller area 110 and each task area 120. In one example implementation, the controller 230 manages the lighting of each task area 110 by cooperatively controlling the ambient light source 416 and the task-level light source 406 of each task area.

The controller 230 can provide daylighting control and lumen maintenance. The controller 230 implements a daylighting process to make use of light from sources other than electric light (e.g., sunlight) for the light source under control, and also implements a lumen maintenance process to ensure that only the required light is used, and no more.

For example, assume first row of office cubicles are cubicles positioned next to a window, and a second row are cubicles separated from the window by the first row of cubicles. Both rows are in a controlled area illuminated by the ambient light source 416. During the daytime, the photo sensor 224 provides ceiling light level data 414 that reports a high level of illumination for the entire controlled area. In response, the controller 230 shuts off the ambient light source 416. Furthermore, the illumination levels of the task areas in the first row of cubicles as reported by the task-level light data 404 indicates that the task areas are sufficiently illuminated, and thus the controller also shuts off the task-level light source 406 for those task areas.

However, the illumination of the task areas in the second row of cubicles may be much less than the illumination of the task areas in the first row of cubicles. The controller 230 thus turns on the task light source 406 in the second row of cubicles and adjusts the task-level illumination in the second row to an acceptable working level (e.g., a predefined or calculated level). If the task-level light source 406 is insufficient to provide for adequate task-level lighting in the second row, then the controller 230 may use the ambient light source 416 to provide additional illumination as required.

The controller 230 can also use occupancy data from the sensors 212 and 412 to adjust task-level lighting and lighting of the controlled area. Continuing with the above example, assume that four cubicles are located in the second row of cubicles, and that only one person is occupying a workspace. As a result, the controller 230 will receive task-level occupancy data 402 that indicates that only one task area needs to be illuminated, and thus will only turn on the task light source 406 for the task area in which task-level occupancy data indicates the presence of a person. The controller 230 can also take into account off-delays for task-level occupancy data, e.g., only dimming or shutting off a task-level light source 406 after the task occupancy data indicates that the task area has been unoccupied for at least 15 minutes.

In some implementations, staggered off-delays can be used for task-levels and the controlled area. For example, an off-delay for the ambient light source is determined by the task and ambient occupancy sensors 212 and 222. Example off-delays of 10 minutes for task area occupancy and 15 minutes for controlled are occupancy are one example configuration. Thus, when a last person leaves a task area, the task lights and plug loads (by use of the plug load controller 408) for that person's task area are turned off after 10 minutes, and the ambient lights after 15 minutes.

In some implementations, the controller 230 uses the task level light data 404 collected for multiple task areas in the controlled area to adjust the light level for the ambient area. For example, if the minimum light level detected by the set of all task area photocell sensors is below a minimum threshold, ambient lights are increased until this minimum light level reaches the threshold. This allows ambient light levels to be set in order to meet target ambient light levels.

In some implementations, the off-delays are adjusted depending on whether occupants are sensed in task areas and general areas. For example, if the load controller 230 detects a vacancy in a task area and occupancy in the general area, the controller 230 sets a longer off-delay for the vacant task area. This ensures that if someone simply walks to another task area in a general area (e.g., an adjoining cubicle) to talk to someone else, the system does not unnecessarily turn off the lights too early. Likewise, if the controller 230 detects a vacancy in a task area and vacancy in the general area, the controller 230 sets a shorter off-delay for the task area, as the likelihood of that person coming back to their task area is further reduced (e.g., four co-workers in four adjoining cubicles leave the office for a lunch appointment or a meeting).

The adjustment of off-delays can be further abstracted to a hierarchy, e.g., a floor may be modeled as root node, and each general area as a child of the parent root node, and each task area as a child of each general area node. If there is vacancy in a child area and occupancy in parent area, the off-delay for the child is increased. Likewise, if there is a vacancy in a child and vacancy in a parent of the child, the off delay for the child area is decreased. Additionally, if there is vacancy in a child and vacancy in parent and grandparent (e.g., the entire floor is empty), the off delay is further reduced. For example, if a person comes in after hours (e.g., at 10:00 PM) to retrieve something from his or her cubicle task area, the lights are turned off very quickly as they vacate each zone in the hierarchy.

In some implementations, the controller 230 can be configured to control particular ambient lights that are immediately above each task area. An ambient light that most directly illuminates a particular task area is referred to as a local ambient light for that task area. When such a mapping is available to the controller 230, the local ambient lights for particular task areas can be controlled to provide ambient lighting for less than the entire controlled area.

In some implementations, the controller 230 can take into account the power consumption of each task-level light source 406 and the ambient light source and determine which configuration of ambient lighting and task lighting will satisfy illumination levels for the least amount of power. For example, assume that during certain daylight conditions, the ambient light source 416, on average, fully illuminates a task area at a power consumption of 60 watts. However, the ambient light source 416 illuminates a minimum of eight task areas at any one time (e.g., the ambient light source may be a bank of fluorescent lights over a row of cubicles). Thus, the ambient light source consumes 480 watts when in use for full illumination. The task-level light source 406 fully illuminates the task area at a cost of 75 watts. Accordingly, when six or fewer occupancy sensors detect occupancy, only the task light sources are used to illuminate the task areas. Conversely, when seven or more occupancy sensors detect occupancy, then only the ambient light source is used to illuminate the task areas.

In some configurations, the ambient light source 416 is used to provide a minimum lighting level for safety measures, e.g., an internal hallway and cubicles may need a minimum amount of ambient lighting so people can see their surroundings. In these implementations, the minimum amount of ambient lighting power can also be considered when determining whether to use the ambient light source 416 or the task-level light source 406 to illuminate task areas. For example, if the minimum ambient lighting power consumption is 110 Watts, then when four or fewer occupancy sensors detect occupancy, then the task-level light source 406 are used as the primary lighting to illuminate the task areas. Conversely, when five or more occupancy sensors detect occupancy, then only the ambient light source is used to illuminate the task areas.

Figure 5A:
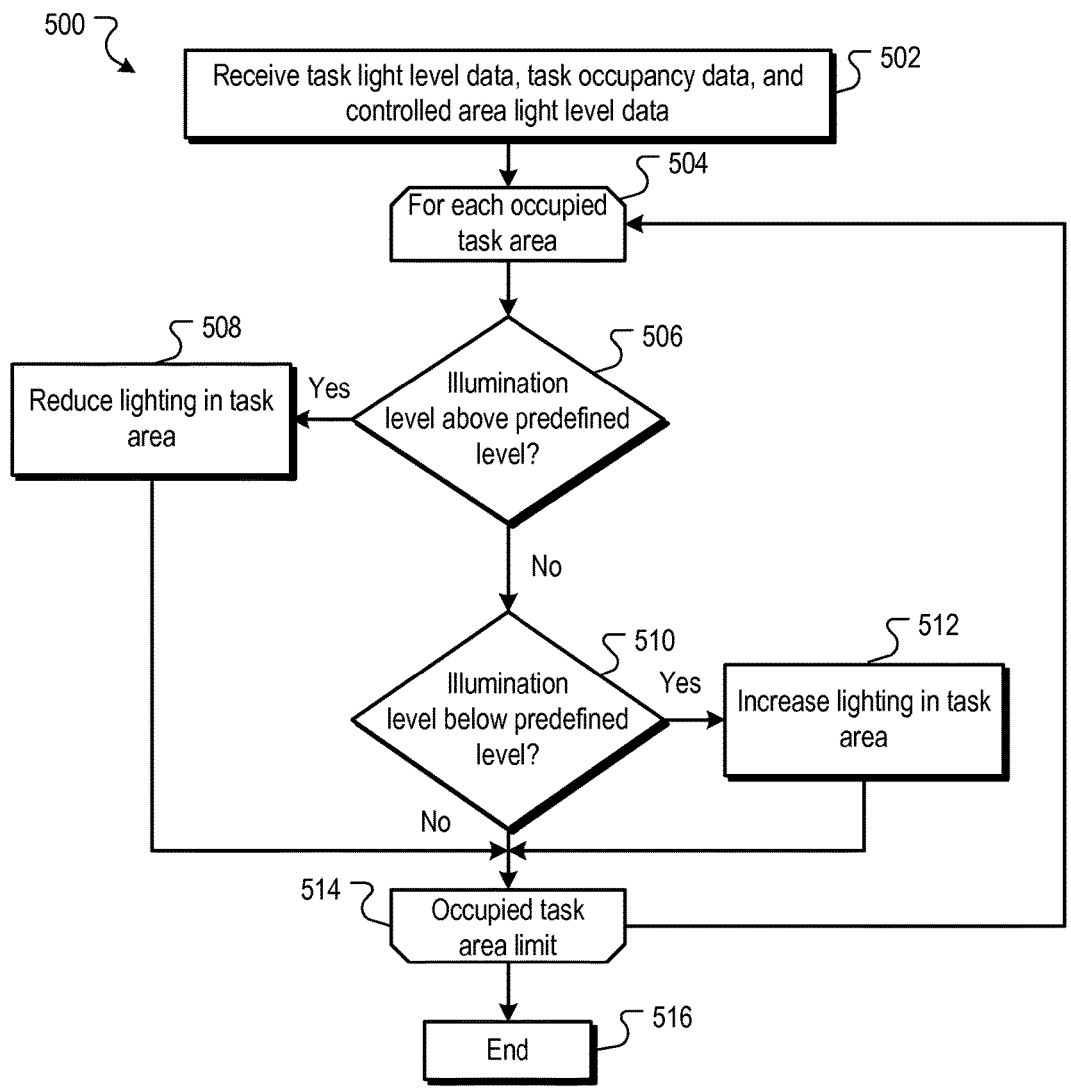
FIG. 5A is a flow diagram of an example process for controlling task-level lighting in task areas and ambient level lighting in a general area.

FIG. 5A is a flow diagram of an example process 500 for controlling task-level lighting in task areas and ambient level lighting in a general area (e.g., a controlled area). The process 500 can be implemented in the load controller 230.

The load controller 230 receives task-level light data, task-level occupancy data, and controlled area light level data. The load controller 230 uses this data to determine illumination levels in the task areas, and which task areas are occupied.

For each occupied task area (504 until the loop limit 514 is met), the controller 230 determines if the illumination level is above a predefined illumination level (506). The predefined illumination level can be a default setting, or can be manually adjusted for each task area by the user of the task area.

In response to determining that an illumination level for a task area is above a predefined illumination level the load controller reduces the lighting in the task area (508). For example, the load controller 230 can instruct the task area light source to decrease the illumination level for the task area until the illumination level of the task area is at the predefined illumination level. The load controller 230 can continue to monitor the illumination level of the task area, determining whether the illumination level for the task area is at the predefined illumination level. The load controller 230 will continue to instruct the task area light source to decrease the illumination level for the task area until the illumination level for the task area is at the predefined level, or until the task area light source is decreased to a minimum setting (e.g., turned completely off, or decreased to a minimum illumination value). If the latter, then the load controller instructs the ambient light source to decrease the illumination level of the controlled area until the illumination level of the task area is at the predefined illumination level.

In some implementations, the load controller 230 can further determine if the illumination level the controlled area is below the predefined level; if so, the load controller will cease instructing the ambient light source to decrease the illumination level of the controlled area.

If, on the other hand, the load controller 230 determines the illumination level is not above the predefined level, the load controller then determines if the illumination level is below the predefined level (510). Although the same predefined level is used for both determinations, in some implementations a maximum illumination level can be used for the predefined level of process step 506, and a minimum predefined level can be used for the process step 510, wherein the maximum predefined level is greater than the minimum predefined level.

In response to determining that an illumination level for a task area is below a predefined illumination level, the load controller increases the lighting in the task area (512). For example, the load controller 230 can instruct the task area light source to increase the illumination level for the task area until the illumination level of the task area is at the predefined illumination level. The load controller 230 will continue to instruct the task area light source to increase the illumination level for the task area until the illumination level for the task area is at the predefined level, or until the task area light source is increased to a maximum setting (e.g., turned completely on). In response to determining that the illumination level for the task area is below the predefined illumination level and determining that the task area light source is increased to a maximum setting, the load controller 230 can then instruct the ambient light source to increase the illumination level of the controlled area until the illumination level of the task area is at the predefined illumination level.

The process 500 is illustrative only, and other control algorithms can also be used. For example, the load controller 230 can first adjust ambient lighting when increasing lighting for task areas, and then adjust task-level lighting in individual task areas as necessary. Similarly, the load controller 230 can first adjust ambient lighting when decreasing lighting for task areas, and then adjust task-level lighting in individual task areas as necessary.

In some implementations, for example, the load controller 230 determines an illumination level for the controlled area. If the illumination level for the controlled area is above a first predefined illumination level, the controller 230 then checks the illumination levels of the occupied task areas. If the illumination levels of the occupied task areas are above a second predefined illumination level, then the controller can instruct the ambient lighting device to reduce the illumination of the controlled area. Alternatively or in addition, the controller 230 can first reduce the task lighting, and then the ambient lighting.

Different predefined illumination levels for the controlled area and task-level areas can be used. For example, the predefined illumination level for the controlled are can be less (or alternatively, more) than the predefined illumination level for task areas.

In some implementations, the use of occupancy sensors can be omitted, and the illumination levels for each task area can be controlled as described above. In these implementations, the control algorithm is as described above, except that every task area is assumed to be occupied.

Figure 5B:
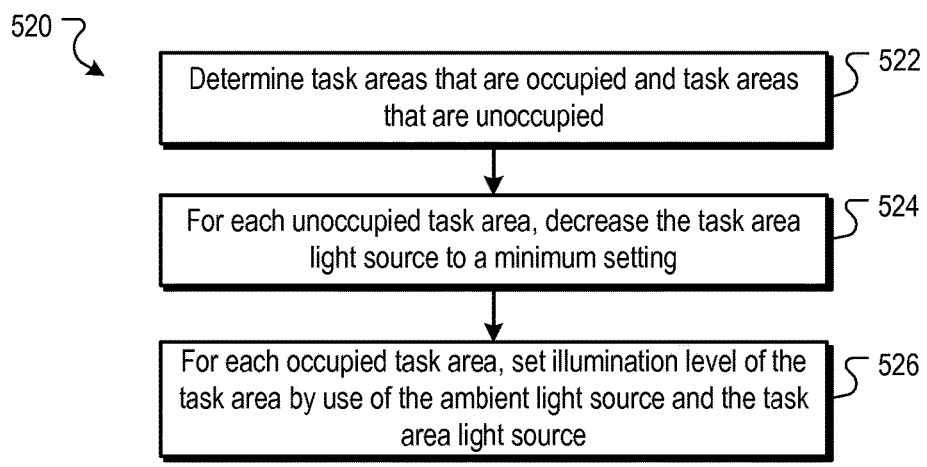
FIG. 5B is a flow diagram of another example process for controlling task-level lighting in task areas and ambient level lighting in a general area.

FIG. 5B is a flow diagram of another example process 520 for controlling task-level lighting in task areas and ambient level lighting in a general area. The process 520 can be implemented in the load controller 230. The process 520 can control task and ambient area lighting based only on occupancy sensor data, or can also take into account photo sensor data in addition to the occupancy sensor data.

The process 520 determines task areas that are occupied and task areas that are unoccupied (522). For example, the load controller can receive task-level occupancy data from task-level occupancy sensors and determine, from the received data, whether each task area is occupied.

For each unoccupied task area, the process 520 decreases the task area light source to a minimum setting (524). For example, the load controller 230 can, after a time out period, decrease the task area light source to a minimum setting, such as fully off or to a minimum illumination level.

For each occupied task area, the process 524 sets an illumination level of the task area by use of the ambient light source and the task area light source (526). For example, the load controller 230 can set both the ambient lighting source and the task area lighting source to maximum illumination levels, or can individually adjust the illumination levels of the ambient lighting source and the task area lighting sources. In the case of the latter, the adjustments can be based on sense illumination levels as described above, or can be based on other factors, such as the time of day or power consumption.

For example, in some implementations the load controller 230 can determine power loads associated with different lighting configurations. A first lighting configuration is one in which the ambient light source is set to a minimum level and each task area light source for each occupied task area is set to an illumination level that provides a minimum acceptable level of task lighting. A second lighting configuration is one in which the ambient light source is set to an illumination level that provides a minimum acceptable level of task lighting for each occupied task area and each task area light source is set to minimum level. The load controller 230 then selects the lighting configuration with the minimum determined power load.

In other implementations, the load controller 230 can set lighting configurations according to the time of day. For example, the load controller 230 can be configured to turn on task area light sources only after certain times of day, e.g., before 9:00 AM and after 4:00 PM, as the ambient lighting, combined with ambient daylight, may provide sufficient lighting between the hours of 9:00 AM and 4:00 PM. Other time constraints can also be used.

In other implementations, the load controller 230 can set lighting configurations according to the time of day and different lighting configurations. For example, the illumination levels of lighting configurations can have different maximum settings during certain times of the day, e.g., task lighting before 9:00 AM may be set to maximum of full illumination; from between 9:00 AM-11:00 AM, and 2:00 PM-4:00 PM, a maximum of 50% illumination; and from 11:00 AM-2:00 PM, a maximum of 25% illumination.

§ 4.0 Additional Implementation Examples

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a personal digital assistant (PDA), a mobile audio or video player, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can optionally be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 6:
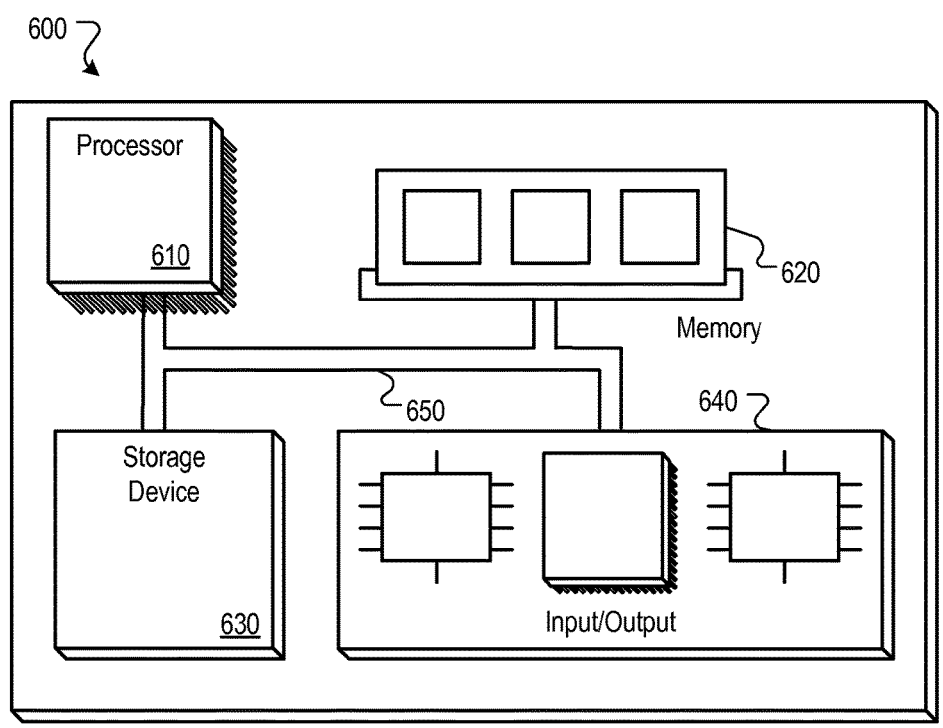
FIG. 6 is a block diagram of a programmable processing system.

An example of a computer in which the above-described techniques can be implemented is shown in FIG. 6, which shows a block diagram of a programmable processing system (system). The system 600 can be utilized to implement the systems and methods described herein.

The system 600 includes a processor 610, a memory 620, a storage device 630, and an input/output device 640. Each of the components 610, 620, 630, and 640 can, for example, be interconnected using a system bus 650. The processor 610 is capable of processing instructions for execution within the system 600. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can, for example, include a hard disk device, an optical disk device, or some other large capacity storage device.

The input/output device 640 provides input/output operations for the system 600. In one implementation, the input/output device 640 can include one or more of a wired network interface device, a serial communication interface device, and/or a wireless interface device.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
a plurality of task-level sensor devices, each task-level sensor device including a sensor device that can sense a physical stimulus and to be positioned to monitor the physical stimulus of only a respective task area and generate task-level sensor data that reports a measured physical stimulus of the respective task area, wherein each of the task areas is a separate sub-portion of a controlled area such that the controlled area includes multiple task areas and an additional area outside of each task area, and each task-level sensor data provides measurements that are responsive to the physical stimulus occurring within the task area it monitors; and
a load controller in communication with the task-level sensor devices and a controlled area sensor, the controlled area sensor for monitoring the physical stimulus of the controlled area inclusive of the multiple task areas and the additional area outside of each task area, and provides measurements that are responsive to the physical stimulus occurring within the multiple task areas and the area outside of the multiple task areas included in the controlled area, and generating controlled area sensor data that reports a measured physical stimulus of the controlled area, wherein the controlled area sensor data are different from any given task-level sensor data, and the load controller performs operations comprising controlling the illumination level of each task area based on the task-level sensor data from the task-level sensor monitoring the task area and the controlled area sensor data.

2. The system of claim 1, wherein:
the task-level sensor device comprises a task-level photo sensor and the physical stimulus is an illumination level of the task area; and
the controlled area sensor comprises a controlled area photo sensor and the physical stimulus is an illumination level of the controlled area.

3. The system of claim 2, wherein the task-level sensor device comprises a task-level occupancy sensor, and the physical stimulus includes an occupancy of the task area.

4. The system of claim 3, wherein:
for each task area, a corresponding task area light source illuminates only the task area to which the light source corresponds;
an ambient light source that illuminates the controlled area; and
the load controller that controls the illumination level of each task area by performing operations, comprising:
determining task areas that are occupied; and
for each occupied task area:
determining an illumination level for the task area;
in response to determining that an illumination level for a task area is above a predefined illumination level, instructing the task area light source to decrease the illumination level for the task area until the illumination level of the task area is at the predefined illumination level; and
in response to determining that an illumination level for a task area is below the predefined illumination level, instructing the task area light source to increase the illumination level for the task area.

5. The system of claim 4, wherein the load controller, in response to instructing the task area light source to increase the illumination level for a task area, performs operations comprising:
determining whether the illumination level for the task area is at the predefined illumination level;
in response to determining that the illumination level for the task area is below the predefined illumination level and determining that the task area light source is increased to a maximum setting, instructing the ambient light source to increase the illumination level of the controlled area until the illumination level of the task area is at the predefined illumination level; and
in response to determining that the illumination level for the task area is below the predefined illumination level and determining that the task area light source is below a maximum setting, instructing the task area light source to increase the illumination level for the task area.

6. The system of claim 4, wherein the load controller, in response to instructing the task area light source to decrease the illumination level for a task area, performs operations comprising:
  determines whether the illumination level for the task area is at the predefined illumination level;
  in response to determining that the illumination level for the task area is above the predefined illumination level and determining that the task area light source is decreased to a minimum setting, then instructing the ambient light source to decreasing the illumination level of the controlled area until the illumination level of the task area is at the predefined illumination level; and
  in response to determining that the illumination level for the task area is above the predefined illumination level and determining that the task area light source is above the minimum setting, instructing the task area light source to decrease the illumination level for the task area.

7. The system of claim 4, wherein the load controller, in response to instructing the task area light source to decrease the illumination level for a task area, performs operations comprising:
  determines whether the illumination level for the task area is at the predefined illumination level;
  in response to determining that the illumination level for the task area is above the predefined illumination level and determining that the task area light source is decreased to a minimum setting, and further determining that no task area is below the predefined illumination level, then instructing the ambient light source to decrease the illumination level of the controlled area until the illumination level of the task area is at the predefined illumination level; and
  in response to determining that the illumination level for the task area is above the predefined illumination level and determining that the task area light source is above the minimum setting, instructing the task area light source to decrease the illumination level for the task area.

8. The system of claim 3, wherein:
  for each task area, a corresponding task area light source illuminates only the task area to which it corresponds;
  an ambient light source illuminates the controlled area; and
  the load controller controls the illumination level of each task area by performing operations comprising:
  determining an illumination level for the controlled area; and
  in response to determining that an illumination level for the controlled area is above a first predefined illumination level, instructing the ambient light source to decrease the illumination level of the controlled area only if the illumination level for each occupied task area is above a second predefined illumination level.

9. The system of claim 8, wherein the first predefined illumination level is less than the second predefined illumination level.

10. The system of claim 2, wherein:
  for each task area, a corresponding task area light source illuminates only the task area to which it corresponds;
  an ambient light source illuminates the controlled area; and
  the load controller controls the illumination level of each task area by performing operations comprising, for each task area:
  determining an illumination level for the task area;
  in response to determining that an illumination level for a task area is above a predefined illumination level, instructing the task area light source to decrease the illumination level for the task area until the illumination level of the task area is at the predefined illumination level; and
  in response to determining that an illumination level for a task area is below the predefined illumination level, instructing the task area light source to increase the illumination level for the task area.

11. The system of claim 1, wherein:
  the task-level sensor device further comprises a task-level occupancy sensor, and the physical stimulus further includes an occupancy of the task area; and
  the controlled area sensor further comprises a controlled area occupancy sensor, and the physical stimulus further includes an occupancy of the controlled area.

12. The system of claim 11, wherein:
  for each task area, a corresponding task area light source illuminates only the task area to which it corresponds;
  an ambient light source illuminates the controlled area; and
  the load controller controls the illumination level of each task area by performing operations comprising:
  determining task areas that are occupied and task areas that are unoccupied;
  for each unoccupied task area, decreasing the task area light source to a minimum setting; and
  for each occupied task area, setting the illumination level of the task area by using the ambient light source and the task area light source corresponding to the task area.

13. The system of claim 12, wherein setting the illumination level of the task area by use the ambient light source and the task area light source corresponding to the task area comprises:
  determining a power load associated with a first lighting configuration in which the ambient light source is set to a minimum level and each task area light source is set to an illumination level that provides a minimum acceptable level of task lighting;
  determining a power load associated with a second lighting configuration in which the ambient light source is set to an illumination level that provides a minimum acceptable level of task lighting for each occupied task area and each task area light source is set to minimum level; and
  selecting the lighting configuration with the minimum determined power load.

14. A method performed by a data processing apparatus, comprising:
  receiving a physical stimulus from a plurality of task-level sensor devices, each task-level sensor device including a sensor device that can sense the physical stimulus and to be positioned to monitor the physical stimulus of only a respective task area and generate task-level sensor data that reports a measured physical stimulus of the respective task area, wherein each of the task areas is a separate sub-portion of a controlled area such that the controlled area includes multiple task areas and an additional area outside of each task area, and each task-level sensor data provides measurements that are responsive to the physical stimulus occurring within the task area it monitors;
  receiving controlled area sensor data that reports a measured physical stimulus of the controlled area inclusive of the multiple task areas and the additional area outside of each task area, and that provides measurements that are responsive to the physical stimulus occurring within the plurality of the task areas and the area outside of the multiple task areas included in the controlled area, wherein the controlled area sensor data are different from any given task-level sensor data; and controlling the illumination level of each task area based on the task-level sensor data from the task-level sensor monitoring the task area and the controlled area sensor data~ wherein the method further comprises:

the task-level sensor device comprises a task-level photo sensor and a task-level occupancy sensor, and the physical stimuli include an illumination level of the task area and an occupancy of the task area;

the controlled area sensor comprises a controlled area photo sensor, and the physical stimulus is an illumination level of the controlled area; and further comprising:
  determining task areas that are occupied; and
  for each occupied task area:
    determining an illumination level for the task area;
    in response to determining that an illumination level for a task area is above a predefined illumination level, instructing a task area light source to decrease the illumination level for the task area until the illumination level of the task area is at the predefined illumination level; and
    in response to determining that an illumination level for a task area is below the predefined illumination level, instructing the task area light source to increase the illumination level for the task area.

15. The method of claim 14, wherein:

the task-level sensor device further comprises a task-level occupancy sensor, and the physical stimulus further includes an occupancy of the task area;

the controlled area sensor further comprises a controlled area occupancy sensor, and the physical stimulus further includes an occupancy of the controlled area; and further comprising:
  determining task areas that are occupied and task areas that are unoccupied;
  for each unoccupied task area, decreasing a task area light source to a minimum setting; and
  for each occupied task area, setting an illumination level of the task area by use the ambient light source and the task area light source corresponding to the task area.

16. A system, comprising:

means for receiving a physical stimulus from a plurality of task-level sensor devices, each task-level sensor device including a sensor device that can sense the physical stimulus and to be positioned to monitor the physical stimulus of only a respective task area and generate task-level sensor data that reports a measured physical stimulus of the respective task area, wherein each of the task areas is a separate sub-portion of a controlled area such that the controlled area includes multiple task areas and an additional area outside of each task area, and each task-level sensor data provides measurements that are responsive to the physical stimulus occurring within the task area it monitors, and for receiving controlled area sensor data that reports a measured physical stimulus of the controlled area inclusive of the multiple task areas and the additional area outside of each task area, and provides measurements that are responsive to the physical stimulus occurring within the plurality of the task areas and the area outside of the multiple task areas included in the controlled area, the controlled area sensor data being different from any given task-level sensor data; and means for controlling the illumination level of each task area and the illumination level of the additional area outside of each task area based on the task-level sensor data from the task-level sensor monitoring the task area and the controlled area sensor data.

* * * * *